(12) United States Patent
Shin

(10) Patent No.: US 10,783,094 B2
(45) Date of Patent: Sep. 22, 2020

(54) FUNCTION VERIFICATION SYSTEM FOR SECONDARY BATTERY MANAGEMENT DEVICE

(71) Applicant: LG CHEM, LTD., Seoul (KR)

(72) Inventor: Kang-Soo Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 799 days.

(21) Appl. No.: 15/520,910

(22) PCT Filed: Feb. 25, 2016

(86) PCT No.: PCT/KR2016/001867
§ 371 (c)(1),
(2) Date: Apr. 21, 2017

(87) PCT Pub. No.: WO2016/137248
PCT Pub. Date: Sep. 1, 2016

(65) Prior Publication Data
US 2017/0365885 A1    Dec. 21, 2017

(30) Foreign Application Priority Data

Feb. 26, 2015  (KR) .......................... 10-2015-0027511

(51) Int. Cl.
*G06F 13/10* (2006.01)
*G06F 11/30* (2006.01)
*H01M 10/42* (2006.01)

(52) U.S. Cl.
CPC ........ *G06F 13/105* (2013.01); *G06F 11/3058* (2013.01); *G06F 13/102* (2013.01);
(Continued)

(58) Field of Classification Search
CPC ....... H01M 10/425; H01M 2010/4271; H01M 2010/4278; H01M 10/4285;
(Continued)

(56) References Cited

U.S. PATENT DOCUMENTS 9,784,780 B2 * 10/2017 Loftus ..................... B60L 50/16
9,817,074 B1 * 11/2017 Li ........................... B60L 3/0046
(Continued)

FOREIGN PATENT DOCUMENTS

KR    10-2003-0039496 A    5/2003
KR       10-1348042 B1     1/2014
(Continued)

OTHER PUBLICATIONS

"BMS Validation System". Bloomy Controls, Inc. 2014. (Year: 2014).*
(Continued)

*Primary Examiner* — Thomas J. Cleary
(74) *Attorney, Agent, or Firm* — Birch, Stewart, Kolasch & Birch, LLP

(57) ABSTRACT

The present disclosure relates to a system capable of verifying an external device control function of a secondary battery management device, and that is coupled with an input/output terminal unit, a communication terminal unit and a measurement terminal unit of the secondary battery management device. The system generates conditions causing operation of the external device, monitors whether an external device control signal is being output normally through the input/output terminal unit of the secondary battery management device, and verifies whether current operation state information for the external device is being maintained exactly in a memory element. The system may include an interface unit to convert the format of the data being transmitted between the computer and the secondary battery management device, and a voltage simulator capable of artificially generating a voltage signal representing the voltage, current and temperature level of the secondary battery and applying the same to the measurement terminal unit.

10 Claims, 2 Drawing Sheets

(52) U.S. Cl.
CPC ............... *H01M 10/4285* (2013.01); *H01M 2010/4271* (2013.01); *H01M 2010/4278* (2013.01)

(58) Field of Classification Search
CPC ............ G06F 11/3003; G06F 11/3058; G06F 11/3068; G06F 11/3089; G06F 11/32; G06F 11/321; G06F 11/324; G06F 11/327; G06F 13/102; G06F 13/105; G01R 31/3842; Y02E 60/12
See application file for complete search history.

(56) References Cited

U.S. PATENT DOCUMENTS

| | | | | |
|---|---|---|---|---|
| 2004/0027091 | A1* | 2/2004 | Hashimoto | B60L 58/10 320/104 |
| 2006/0132098 | A1* | 6/2006 | Lin | G01R 35/005 320/150 |
| 2012/0119765 | A1* | 5/2012 | Bracker | H01M 10/42 324/750.01 |
| 2012/0150503 | A1* | 6/2012 | Haupt | H01M 10/4285 703/2 |
| 2012/0166918 | A1 | 6/2012 | Svendsli et al. | |
| 2013/0006599 | A1* | 1/2013 | Burkes | G06F 30/367 703/13 |
| 2013/0151227 | A1* | 6/2013 | Yang | H02J 7/0022 703/18 |
| 2015/0066416 | A1* | 3/2015 | Loftus | G01R 31/69 702/120 |
| 2015/0280464 | A1* | 10/2015 | Kang | B60L 58/21 320/116 |
| 2017/0351225 | A1* | 12/2017 | Hoenig | H01M 10/4207 |

FOREIGN PATENT DOCUMENTS

| | | |
|---|---|---|
| KR | 10-2005-0005617 A | 10/2014 |
| KR | 10-2014-0115617 A | 10/2014 |
| KR | 10-2014-0120161 A | 10/2014 |

OTHER PUBLICATIONS

Qing, Wang, et al. "Hardware-In-Loop Test Platform for Electric Vehicle Cell Battery Management System". Applied Mechnaics and Materials. ISSN: 1662-7482. vols. 29-32. pp. 2398-2403. Aug. 13, 2010. (Year: 2010).*

Haupt, Hagen, et al. "Hardware-in-the-Loop Test of Battery Management Systems". 7th IFAC Symposium on Advances in Automotive Control. The International Federation of Automatic Control. Sep. 4-7, 2013. Tokyo, Japan. pp. 658-664. (Year: 2013).*

"A Solutin for Testing Battery Management Systems". Evaluation Engineering. Online Mar. 13, 2010. Retrieved from Internet Mar. 20, 2020. <https://www.evaluationengineering.com/home/article/13004519/a-solution-for-testing-battery-management-systems>. (Year: 2010).*

International Search Report; issued in PCT/KR2016/001867, dated Sep. 5, 2016.

* cited by examiner

FUNCTION VERIFICATION SYSTEM FOR SECONDARY BATTERY MANAGEMENT DEVICE

TECHNICAL FIELD

The present application claims priority to Korean Patent Application No. 10-2015-0027511 filed on Feb. 26, 2015 in the Republic of Korea, the disclosures of which are incorporated herein by reference.

The present disclosure relates to a system capable of verifying functions of a secondary battery management device.

BACKGROUND ART

Recently, the purpose of use of secondary batteries is rapidly spreading to not only mobile devices such as mobile phones, laptop computers and the like, but also to fields such as vehicles driven by electricity (EV, HEV, PHEV), or electricity storage systems and the like.

A secondary battery management device continuously monitors the voltage, current and temperature, and state of charge and the like of a secondary battery during charging or discharging of the secondary battery, and opens a charge/discharge line of the secondary battery or cools the secondary battery when the secondary battery has fallen in an over-charged, over-discharged or over-heated state. For this purpose, the secondary battery management device is connected to an external device such as a relay switch module and a cooling fan module through an I/O interface.

Of the various functions that a secondary battery management device performs, the control function of the external device is very important in terms of safety of the secondary battery. Therefore, it is necessary to closely verify the control function regarding the external device before mounting the secondary battery management device onto a load apparatus.

According to a conventional technique, in order to verify the control function regarding the external device of the secondary battery management device, the secondary battery management device is set up under the same testing conditions as the environment where the secondary battery is actually being used, and then a developer directly performs a verification operation manually according to preset testing items.

However, not only does such a verification method take a lot of time but also a human error of the developer performing the verification may intervene, and thus there is a problem of low reliability and the verification result varying depending on the verification proficiency of the developer.

DISCLOSURE

Technical Problem

The present disclosure is designed to solve the problems of the related art, and therefore the present disclosure is directed to providing a system capable of reliably verifying the control function of a secondary battery management device regarding an external device even without setting the secondary battery management device under the same hardware conditions as the actual use environment.

Technical Solution

In one aspect of the present disclosure, there is provided a function verification system of a secondary battery management device, the system coupled with an input/output terminal unit, a communication terminal unit, and a measurement terminal unit of the secondary battery management device.

Preferably, the system includes a computer that is configured to execute a verification program and that includes an input/output(I/O) interface, and the verification program intentionally generates a condition that causes operation of the external device, monitors whether an external device control signal is being normally output through the input/output terminal unit of the secondary battery management device, and verifies whether current operation state information for the external device is being maintained exactly in the memory element.

The system may include an interface unit in order to convert the format of the data being transmitted between the computer and the secondary battery management device, and a voltage simulator capable of artificially generating a voltage signal representing a voltage, current and temperature level of the secondary battery and applying the same to the measurement terminal unit.

The verification program may provide a user interface in which a verification condition is arbitrarily set and a verification result is visually displayed.

According to one aspect, the interface unit converts the external device control signal being output from the input/output terminal unit and the transmitting communication message including the operation state information for the external device being output through the communication terminal unit into a data format that may be transmitted through the input/output interface, and transmits the same to the verification program through the input/output interface.

In another aspect, the interface unit converts a virtual response signal that includes the operation state information for the external device being output through the input/output interface from the verification program and a receiving communication message demanding the operation state information for the external device into a data format that may be transmitted through the input/output terminal unit and the communication terminal unit, respectively, and then outputs the same to the secondary battery management device through the input/output terminal unit and the communication terminal unit.

Preferably, the verification program generates the receiving communication message and outputs the same through the input/output interface, and when the converted external device control signal is received through the input/output interface, outputs the virtual response signal through the input/output interface.

According to another aspect, when the transmitting communication message is received through the input/output interface, the verification program compares the operation state informations for the external device included in the virtual response signal and the transmitting communication message, and determines a verification result regarding the external device control function of the secondary battery management device according to whether the operation state informations are identical and displays the same on a monitor of the computer in the form of a graphic interface.

In an example, the external device may be a relay switch module that includes a relay that opens/closes a charge/discharge line of the secondary battery and a relay driving circuit.

In this case, the operation state information for the external device may be information representing an on/off state of the relay.

In another example, the external device may be a cooling fan module including a cooling fan and a cooling fan driving circuit.

In this case, the operation state information for the external device may be information representing an on/off state and a rotation speed (RPM) of the cooling fan.

Preferably, the input/output interface may be a USB or RS232 interface.

Preferably, the voltage simulator may apply a voltage corresponding to each of the voltage, current and temperature of the secondary battery through the measurement terminal unit. Further, the verification program may receive input of a setting value of the voltage, current and temperature of the secondary battery from a verifier of the secondary battery management device, and transmit a voltage applying request signal corresponding to the input setting value of the voltage, current and temperature to the voltage simulator through the input/output interface of the computer.

Preferably, the verification program may provide the verifier of the secondary battery management device with a user interface where the setting value of the voltage, current and temperature of the secondary battery may be input as a verification condition through a monitor.

Preferably, the verification program may receive the external device control signal after transmitting the voltage applying request signal.

Preferably, the input/output terminal unit may be an I/O interface, and the communication terminal unit may be a CAN communication interface.

Preferably, the verification program may output the virtual response signal through the input/output interface, and then generate the receiving communication message and output the same through the input/output interface.

Advantageous Effects

According to one aspect of the present disclosure, it is possible to reliably verify the control function of a secondary battery management device for an external device even without setting the secondary battery management device under the same conditions as the actual use environment of the secondary battery management device.

According to another aspect of the present disclosure, it is possible to reliably implement verification right away even on secondary battery management devices having different specifications by changing the setting conditions of the verification program.

According to yet another aspect of the present disclosure, since the verification result of the secondary battery management device is visually confirmed through the verification program, even an inexperienced developer can perform a verification of the secondary battery management device with ease and convenience.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

Figure 1:
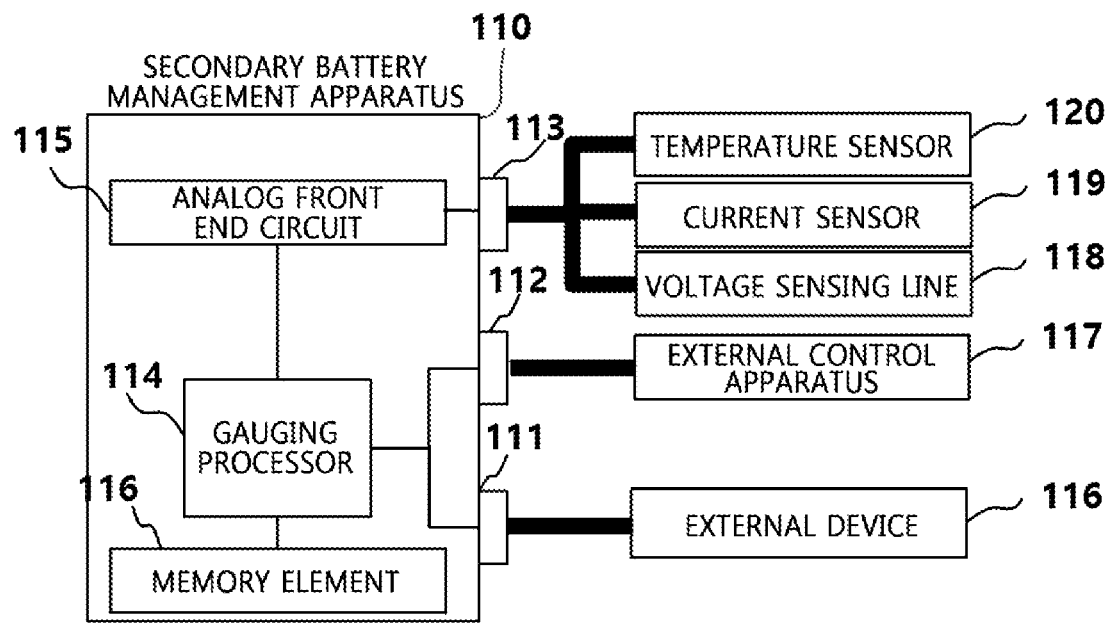
FIG. 1 is a view illustrating a connection relation that a secondary battery management device generally forms with other external components.

FIG. 1 is a view illustrating a connection relation that a secondary battery management device generally forms with other external components.

Referring to FIG. 1, the secondary battery management device 110 is publicly known as a battery management system (BMS) in the related art, and may include an input/output terminal unit 111, a communication terminal unit 112, a measurement terminal unit 113, a gauging processor 114, an analog front end circuit 115 and a memory element 116, etc.

The secondary battery management device 110 is realized in the form of a printed circuit board (PCB), and performs functions of measuring the voltage, temperature and current of a secondary battery and estimating the state of charge (SOC) and state of health (SOH) of the secondary battery using the measured values, and when situations of overcharged, over-discharged, over-heated and the like of the secondary battery are sensed, disconnecting the charge/discharge line of the secondary battery or driving the cooling fan to maintain the temperature of the secondary battery at an appropriate level and the like.

Such functions correspond to publicly known functions that the secondary battery management device 110 performs, and thus detailed explanation thereof will be omitted. Further, it is to be noted that in explaining the functions of each of the configurative elements configuring the secondary battery management device 110 hereinafter, the main focus will be on the functions closely related to the present disclosure.

The input/output terminal unit 111 is an I/O interface configured to transmit a control signal towards an external device 116, operations of which are controlled by the secondary battery management device 110, or receive a control response signal being transmitted from the external device 116.

An example of the external device 116 is a relay switch module. The relay switch module refers to an electric component installed on a power line connecting between the secondary battery and a load, and configured to open/close a charge/discharge line.

The relay switch module includes a relay switch and a relay driving circuit. The relay switch consists of a mechanical switch, a contact point of which is opened/closed by an electromagnet or a semiconductor switch such as a solid state relay (SSR). The relay driving circuit controls an on/off of the relay switch according to the external device control signal being output through the input/output terminal unit 111, and outputs a control response signal that represents the current operation state (on or off) of the relay according to the control results of the relay to the gauging processor 114 through the input/output terminal unit 111.

Another example of the external device 116 is a cooling fan module. The cooling fan module includes a cooling fan configured to lower the temperature of the secondary battery by supplying cooling air to the secondary battery when the temperature of the secondary battery rises to a critical value or above, and a cooling fan driving circuit configured to control the rotation speed of the cooling fan according to the external device control signal being output through the input/output terminal unit 111 and output a control response signal representing an on/off state and the driving speed (RPM) of the cooling fan according to the control results of the cooling fan.

The communication terminal unit 112 is a communication interface that is used when the gauging processor 114 performs communication with an external control apparatus 117.

Examples of the communication interface include CAN communication interface, Daisy Chain communication interface, RS232 interface and the like, but the present disclosure is not limited thereto.

The external control apparatus 117 is an apparatus included in a load apparatus onto which the secondary battery is mounted, and an electronic component computer apparatus of an electric vehicle is an example of the external control apparatus 117.

For convenience of explanation, a digital communication signal being input through the communication terminal unit 112 from outside is called a receiving communication message, and on the contrary, a digital communication signal that goes outside through the communication terminal unit 112 is called a transmitting communication message.

The measurement terminal unit 113 is a connector that includes a plurality of voltage measurement pins to which a DC voltage signal corresponding to the voltage, current and temperature level of the secondary battery is input.

The measurement terminal unit 113 includes a voltage measurement pin connected with a voltage sensing line to which the voltage of the secondary battery is applied, a current measurement pin connected with a current sensor (i.e. hall sensor) that senses a charge or discharge current of the secondary battery and outputs a voltage signal corresponding to the magnitude of the current, and a temperature measurement pin connected with a temperature sensor (i.e. thermocouple) that senses the temperature of the secondary battery and outputs a voltage signal corresponding to the temperature level.

The analog front end circuit 115 is an analog voltage signal processing circuit electrically connected with the measurement terminal unit 113 to be input with a voltage signal corresponding to the voltage, current and temperature level of the secondary battery and to output the same to the gauging processor 114.

The gauging processor 114 is one that is realized in the form of a semiconductor element, for example, an application specific integrated circuit (ASIC) chip, and that is configured to convert an analog voltage signal being input through the analog front end circuit 115 into a digital value, and then perform a predefined operation to compute the voltage, current and temperature of the secondary battery and record the same in the memory element 116.

The memory element 116 is an element where digital data may be recorded or deleted, and may consist of nonvolatile memory element or a volatile memory element.

The memory element 110 may consist of RAM, ROM, register, flash memory and the like, but the present disclosure is not limited thereto.

The memory element 116 may be connected with the gauging processor 114 through a data bus and the like thereby to be accessed by the gauging processor 114.

The memory element 116 stores and/or updates and/or deletes and/or transmits a program that includes various control logics that the gauging processor 114 performs, and/or data being generated when the control logic is being executed.

The memory element 116 may be logically divided into two or more elements, and the memory element 116 is not limited to being included in the gauging processor 114.

Preferably, the gauging processor 114 controls charging or discharging of the secondary battery using the voltage, current and temperature information on the secondary battery stored in the memory element 116, and if the voltage and/or current and/or temperature level deviate from a critical range, outputs an external device control signal to the external device 116 in order to disconnect the charge/discharge line of the secondary battery or to cool the secondary battery through the input/output terminal unit 111.

The gauging processor 114 also generates information indicating the operation state of the external device and records the same in the memory element 116 when the control response signal is input from the external device through the input/output terminal unit 111.

Here, the operation state information may include information representing whether the relay switch is on or off, or information representing whether the cooling fan is on or off and the rotation speed of the cooling fan.

When the receiving communication message is input from the external control apparatus 117 through the communication terminal unit 112, the gauging processor 114 performs information processing according to the command included in the receiving communication message and then incorporates the result information of the information processing in the transmitting communication message and transmits the same to the external control apparatus 117.

For example, if the receiving communication message includes a command that demands transmission of the operation state information of the external device 16, the gauging processor 114 reads the operation state information for the external device 116 among the information recorded in the memory element 116, and incorporates the operation state information in the transmitting communication message thereby to transmit the same to the external control apparatus 117 through the communication terminal unit 112.

In general, in order to verify the external device control function of the secondary battery management device 110 above, a verification test is normally conducted after setting substantially the same verification testing condition as that illustrated in FIG. 1.

The present disclosure hereinafter provides a method for reliably verifying the control function of the external device by connecting the secondary battery management device 110 to a verification system capable of virtually verifying the control function of the secondary battery management device 110 unlike a general verification test.

Figure 2:
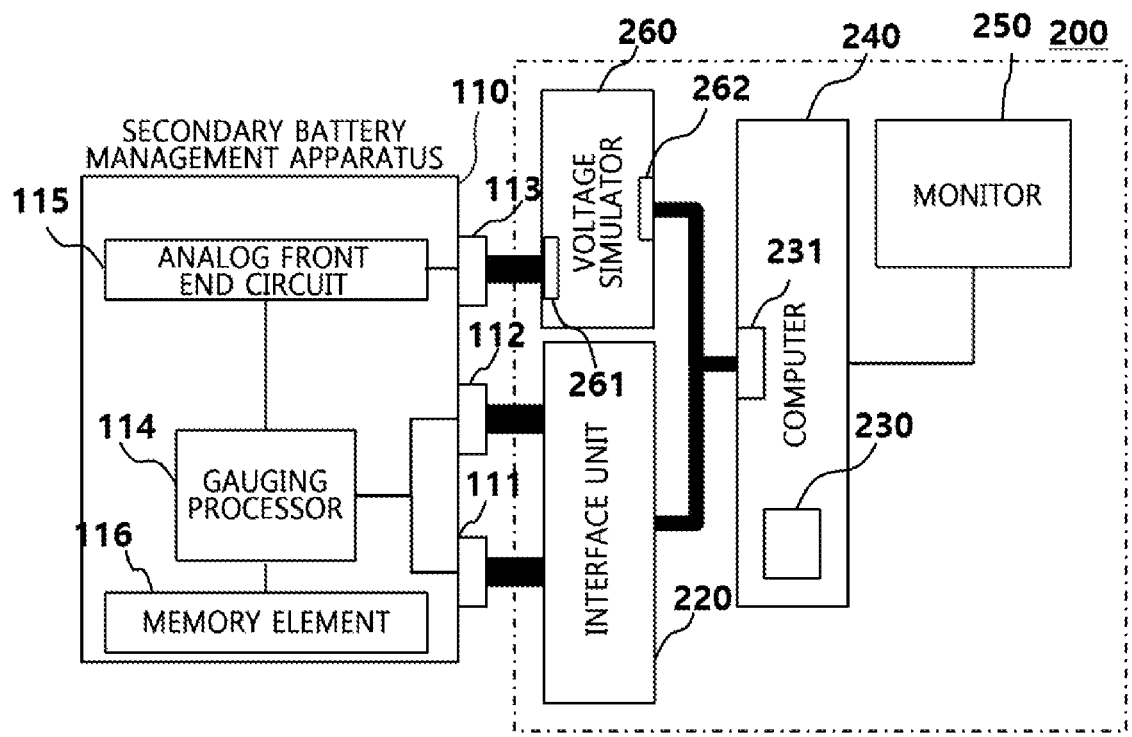
FIG. 2 is a block diagram schematically illustrating a configuration of a verification system of a secondary battery management device according to an embodiment of the present disclosure.

FIG. 2 illustrates a state where a verification system 200 for the secondary battery management device according to an embodiment of the present disclosure is coupled with the secondary battery management device 110 and a schematic configuration of the verification system 200.

As illustrated in FIG. 2, the verification system 200 according to the present disclosure includes an interface unit 220 that is hardware coupled with the secondary battery management device 110, and a computer 240 that includes an input/output interface 231 such as a USB or RS232 and that executes a verification program 230 designed as software.

The interface unit 220 receives the external device control signal being output from the input/output terminal unit 111 and the transmitting communication message that the gauging processor 114 outputs through the communication terminal unit 112.

The interface unit 220 also converts the external device control signal and the transmitting communication message into a digital data format suitable for being transmitted through the input/output interface 231.

For example, in the case where the input/output interface 231 is the USB or RS232 interface, the interface unit 220 converts the external device control signal and the transmitting communication message into a format suitable to each interface.

The interface unit 220 also transmits the external device control signal and the transmitting communication message, the data format of which has been converted, to the verification program 230 that is being executed in the computer 240 through the input/output interface 231.

The verification program 230 outputs a preset external device virtual response signal through the input/output interface 231 when the external device control signal, the format of which has been converted, is input through the input/output interface 231. Further, the verification program 230 generates a receiving communication message that includes a command to be transmitted to the gauging processor 114 and outputs the same through the input/output interface 231.

The interface unit 220 also converts the format of the external device virtual response signal and the receiving communication message being output through the input/output interface 231 from the verification program 230 into a digital data format suitable for being transmitted through the input/output terminal unit 111 and the communication terminal unit 112.

For example, when the input/output terminal unit 111 and the communication terminal unit 112 are an I/O interface and a CAN communication interface, respectively, the interface unit 220 converts the external device virtual response signal and the receiving communication message into a data format suitable to each interface.

The interface unit 220 also transmits the converted external device virtual response signal and the receiving communication message to the gauging processor 114 through the input/output terminal unit 111 and the communication terminal unit 112, respectively.

In the present disclosure, the external device virtual response signal includes the operation state information for the external device.

For example, the external device virtual response signal may include information representing an on/off state of the relay switch or an on/off state and rotation rpm of the cooling fan.

If the external device control signal includes a command to turn on the relay switch, the external device virtual response signal includes information representing that the relay switch is in an on state.

Further, if the external device control signal includes a command to rotate the cooling fan by a certain rpm, the external device virtual response signal includes information that the cooling fan is in an on state and is being rotated by the certain rpm.

When the external device virtual response signal, the format of which has been converted, is input through the input/output terminal unit 111, the gauging processor 114 identifies the operation state information for the external device included in the signal and updates the operation state information for the external device stored in the memory element 116, that is, the information for an on/off state of the relay switch and the on/off state and rotation rpm of the cooling fan.

In the present disclosure, the receiving communication message that the verification program 230 transmits to the gauging processor 114 includes an information request command.

Preferably, the information request command may be a command requesting the operation state information for the external device stored in the memory element 116.

When the receiving communication message, the format of which has been converted, is input through the communication terminal unit 112, the gauging processor 114 identifies the information request command included in the communication message, reads the operation state information for the external device stored in the memory element 116, that is, the information for an on/off state of the relay switch and/or an on/off state of the cooling fan and/or rotation rpm of the cooling fan, incorporates the read operation state information in the transmitting communication message, and outputs the same to the interface unit 220 through the communication terminal unit 112. Then, the interface unit 220 converts the format of the transmitting communication message into a form that may be transmitted through the input/output interface 231 and transmits the same to the verification program 230 that is being executed in the computer 240.

The verification program 230 identifies the operation state information for the external device included in the transmitting communication message when the transmitting communication message, the format of which has been converted, is input through the input/output interface 231.

The verification program 230 also determines whether the identified operation state information is identical to the operation state information included in the external device virtual response signal.

If the two operation state informations are identical to each other, the verification program 230 determines that the external device control function of the secondary battery management device 110 operates normally, and visually displays the determination result on a monitor 250 connected to the computer 240.

On the contrary, if the two operation state informations are not identical to each other, the verification program 230 determines that the external device control function of the secondary battery management device 110 operates abnormally, and visually displays the determination result on the monitor 250 connected to the computer 240.

Here, to display visually means displaying the control verification result for the external device performed by the secondary battery management device 110 in text, or in static or dynamic images.

It is preferable that the verification system 200 according to an embodiment of the present disclosure further includes a voltage simulator 260 in order to effectively verify whether the secondary battery management device 110 can normally control the external device when the secondary battery has fallen in the over-charged, over-discharged or over-heated state.

Preferably, the voltage simulator 260 includes a first connecting unit 261 and a second connecting unit 262.

The first connecting unit 261 includes three pin holes connected to wires to which the DC voltage corresponding to at least the voltage, current and temperature level of the secondary battery are applied, respectively. The three pin holes may each be coupled with three voltage measurement pins provided in the measurement terminal unit 113. When the pin and pin hole corresponding to each other are coupled to each other, the voltage simulator 260 is electrically connected to the measurement terminal unit 113 of the secondary battery management device 110.

The second connecting unit 262 is connected to the input/output interface 231 provided in the computer 240, and receives input of a voltage applying request signal from the verification program 220 being executed in the computer 240. The voltage applying request signal includes the voltage value corresponding to each of the voltage, current and temperature level of the secondary battery preset by the verifier of the secondary battery management device 110.

When the voltage applying request signal is received through the second connecting unit 262, the voltage simulator 260 identifies the voltage applying condition included in the signal and applies to the wire connected to each pin hole the voltage corresponding to the voltage, current and temperature level of the secondary battery according to the identified voltage applying condition.

When the voltage is applied to the wire connected to each pin hole, the analog front end circuit 115 measures the voltage corresponding to the voltage, current and temperature of the secondary battery through the pin of the measurement terminal unit 113 connected to each pin hole in the form of analog voltage signals, and outputs the same to the gauging processor 114. Then, the gauging processor 114 converts the analog voltage signal into a digital value, and then performs a predefined operation to obtain the voltage, current and temperature value of the secondary battery, and stores the same in the memory element 116.

Meanwhile, when the voltage, current and temperature value of the secondary battery deviate from the preset critical range, the gauging processor 114 determines that the secondary battery is in the over-charged, over-discharged or over-heated state, and outputs an external device control signal for controlling the external device such as the relay switch or the cooling fan through the input/output terminal unit 111.

Then, after the format of the external device control signal is converted through the interface unit 220, the external device control signal is transmitted to the verification program 230 that is being executed in the computer 240, and the verification program 230 generates an external device virtual response signal that includes the operation state information for the external device and transmits the same to the gauging processor 114 through the interface unit 220. In this case, the format regarding the external device virtual response signal is obviously converted as well. Further, the gauging processor 114 identifies the operation state information for the external device from the external device virtual response signal, and updates the operation state information for the external device stored in the memory element 116.

Meanwhile, after a preset period of time elapses after outputting the external device virtual response signal, the verification program 230 generates a receiving communication message that includes an information request command, and transmits the same to the gauging processor 114 through the interface unit 220 and the communication terminal unit 112. Then, the gauging processor 114 identifies the information request command included in the receiving communication message, reads the operation state information for the external device stored in the memory element 116, generates the transmitting communication message that includes the operation state information for the external device, and outputs the same to the interface unit 220 through the communication terminal unit 112.

The format of the transmitting communication message is converted by the interface unit 220, and is then transmitted to the verification program 230 through the input/output interface 231 of the computer.

When the transmitting communication message, the format of which has been converted, is input through the input/output interface 231, the verification program 230 identifies the operation state information for the external device included in the transmitting communication message.

The verification program 230 also determines whether the identified operation state information is identical to the operation state information included in the external device virtual response signal.

If the two operation state informations are identical to each other, the verification program 230 determines that the external device control function of the secondary battery management device 110 operates normally, and visually displays the determination result on the monitor 250 connected to the computer 240.

On the contrary, if the two operation state informations are not identical to each other, the verification program 230 determines that the external device control function of the secondary battery management device 110 operates abnormally, and visually displays the determination result on the monitor 250 connected to the computer 240.

Figure 3:
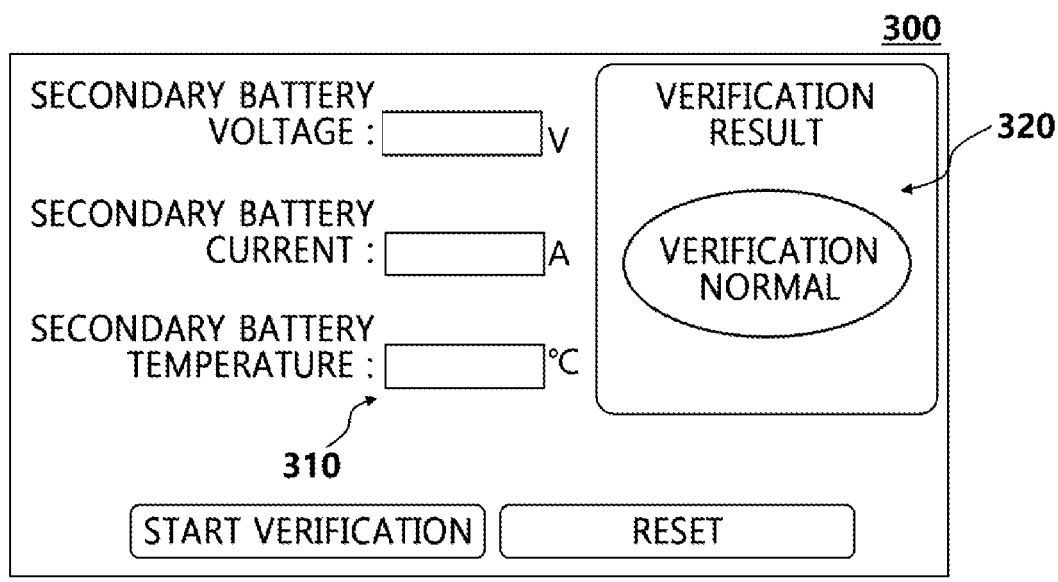
FIG. 3 is a view exemplifying an example where a user interface and verification results of a verification program are visually displayed.

FIG. 3 is a view exemplifying a user interface of the verification program 230.

As illustrated in the drawing, the user interface 300 includes a field 310 used for setting the voltage, current and temperature condition of the secondary battery when verifying the secondary battery management device 110, a field 320 where the verification result regarding the external device control function of the secondary battery management device 110 are visually displayed, a button for requesting start of verification, and a button for resetting the user interface.

When the button to start verification is manipulated, the verification program 230 identifies the voltage, current and temperature information for the secondary battery input in the condition setting field, computes the voltage value corresponding to the identified setting value, and then generates the voltage applying request signal that includes the computed voltage values and outputs the same to the voltage simulator 260 through the input/output interface 231.

Then, the voltage simulator 260 identifies voltage values included in the voltage applying request signal, and independently applies the DC voltage corresponding to the voltage, current and temperature of the secondary battery to each wire connected to the pin holes of the first connecting unit 261 according to the identified voltage values.

Then, the voltage signal corresponding to the voltage, current and temperature of the secondary battery is transmitted to the gauging processor 114 through the analog front end circuit 115, and the aforementioned control logic is executed.

The verification program may visually display the verification results regarding the control function for the external device that the secondary battery management device 110 performs on a verification result displaying field 320 as illustrated in FIG. 3.

According to the present disclosure, the developer that performs verification of the secondary battery management device 110 may set the voltage, current and temperature of the secondary battery under various conditions on the user interface screen thereby to conveniently verify whether the secondary battery management device 110 normally performs the control function for the external device.

Further, even when the conditions where the external device operates vary depending on the specification of the secondary battery, the verification condition may be set variously suitably to the specification of the secondary battery on the user interface screen, and thus the external device control function of the secondary battery management device 110 may be conveniently verified without limitation to the specification of the secondary battery.

In the present disclosure, the type of the external device is not limited to only the relay switch module and the cooling fan module. Therefore, it should be understood that any external device may be included in the scope of the present disclosure as long as it is an external device that can be connected through the input/output terminal unit 111.

In describing a variety of aspects of the present disclosure, the elements with names ending with 'unit' should be understood as the elements that are distinguished functionally, rather than being distinguished physically. Accordingly, the respective elements may be optionally incorporated with another element, or each of the elements may be divided into sub-elements such that the respective elements efficiently implement control logic(s). However, even when the elements are incorporated or divided, it will be obvious to those skilled in the art that the incorporated or divided elements also fall under the scope of the present disclosure, as long as the sameness of functions is acknowledged.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

INDUSTRIAL APPLICABILITY

According to one aspect of the present disclosure, it is possible to reliably verify the control function of a secondary battery management device for an external device even without setting the secondary battery management device under the same conditions as the actual use environment of the secondary battery management device.

According to another aspect of the present disclosure, it is possible to reliably implement verification right away even on secondary battery management devices having different specifications by changing the setting conditions of the verification program.

According to yet another aspect of the present disclosure, since the verification result of the secondary battery management device is visually confirmed through a verification program, even an inexperienced developer may perform a verification of the secondary battery management device with ease and convenience.

What is claimed is:

1. A system for verifying an external device control function of a secondary battery management device, the secondary battery management device includes an input/output terminal unit, a communication terminal unit, a measurement terminal unit and a gauging processor, the system comprising:
   a computer including an input/output interface, and configured to execute a verification program;
   a voltage simulator configured to apply a voltage corresponding to each of a voltage, current and temperature of the secondary battery through the measurement terminal unit; and
   an interface unit connected to the computer via the input/output interface and configured to:
   convert an external device control signal being output from the input/output terminal unit and a transmitting communication message being output from the gauging processor including operation state information for the external device, which is output through the communication terminal unit, into a data format that may be transmitted through the input/output interface,
   transmit the converted external device control signal to the verification program through the input/output interface, and
   convert a virtual response signal including the operation state information for the external device being output through the input/output interface from the verification program and a receiving communication message demanding the operation state information for the external device into a data format that may be transmitted through the input/output terminal unit and the communication terminal unit to the secondary battery management device, respectively, and then
   output the converted virtual response signal through the input/output terminal unit and the communication terminal unit to the gauging processor,
   wherein the verification program is configured to:
   generate the receiving communication message and output the same through the input/output interface,
   output the virtual response signal through the input/output interface when the converted external device control signal is received through the input/output interface,
   compare the operation state informations for the external device included in the virtual response signal and the transmitting communication message when the transmitting communication message is received through the input/output interface, and
   determine a verification result regarding the external device control function of the secondary battery management device according to whether the operation state informations are identical and display the same on a monitor of the computer,
   wherein the verification program is configured to receive input of a setting value of the voltage, current and temperature of the secondary battery set from a user via a verifier of the secondary battery management device, and transmit a voltage applying request signal corresponding to the input setting value of the voltage, current and temperature to the voltage simulator through the input/output interface of the computer, and the voltage simulator applies the setting value of the voltage, current and temperature to the gauging processor.

2. The system of claim 1, wherein the external device is a relay switch module that includes a relay that opens/closes a charge/discharge line of the secondary battery and a relay driving circuit.

3. The system of claim 2, wherein the operation state information for the external device is information representing an on/off state of the relay.

4. The system of claim 1, wherein the external device is a cooling fan module that includes a cooling fan and a cooling fan driving circuit.

5. The system of claim 4, wherein the operation state information for the external device is information representing an on/off state and a rotation speed of the cooling fan.

6. The system of claim 1, wherein the input/output interface is a USB or RS232 interface.

7. The system of claim 1, wherein the verification program is configured to provide the verifier of the secondary battery management device with a user interface where the setting value of the voltage, current and temperature of the secondary battery may be input as a verification condition.

8. The system of claim 1, wherein the verification program is configured to receive the external device control signal after transmitting the voltage applying request signal.

9. The system of claim 1, wherein the input/output terminal unit is an I/O interface, and the communication terminal unit is a CAN communication interface.

10. The system of claim 1, wherein the verification program is configured to output the virtual response signal through the input/output interface, and then generate the receiving communication message and output the same through the input/output interface.

* * * * *